United States Patent [19]

Vogelsang et al.

[11] Patent Number: 5,794,588

[45] Date of Patent: Aug. 18, 1998

[54] DRIVE UNIT WITH AN ENGINE AND A RETARDER

[75] Inventors: Klaus Vogelsang, Crailsheim; Peter Rose, Ilshofen; Helmut Ott; Peter Heilinger, both of Crailsheim, all of Germany

[73] Assignee: Voith Turbo GmbH & Co. KG, Heidenheim, Germany

[21] Appl. No.: 844,699

[22] Filed: Apr. 25, 1997

[30] Foreign Application Priority Data

Apr. 25, 1996 [DE] Germany .............. 196 16 425.7

[51] Int. Cl.⁶ .................................. F02D 39/02
[52] U.S. Cl. .................................. 123/320
[58] Field of Search .................... 123/320, 41.13, 123/142.5 R, 319; 188/292, 296

[56] References Cited

U.S. PATENT DOCUMENTS

| | | | |
|---|---|---|---|
| 2,750,009 | 6/1956 | Pohl | 188/90 |
| 3,051,273 | 8/1962 | Cordiano et al. | 188/90 |
| 3,650,358 | 3/1972 | Bessiere | 188/296 |
| 3,720,372 | 3/1973 | Jacobs | 237/12.3 |
| 3,860,097 | 1/1975 | Braschler et al. | 188/296 |
| 3,919,844 | 11/1975 | Elderton | 60/330 |
| 4,169,414 | 10/1979 | Muller | 105/61 |
| 4,175,647 | 11/1979 | Hanke | 188/274 |
| 4,200,002 | 4/1980 | Takahashi | 74/530 |
| 4,411,340 | 10/1983 | Brosius et al. | 188/296 |
| 4,458,792 | 7/1984 | Thomas et al. | 188/296 |
| 4,474,270 | 10/1984 | Vogelsang | 188/296 |
| 4,538,553 | 9/1985 | Kurz et al. | 123/41.13 |
| 4,744,443 | 5/1988 | Brosius | 188/292 |
| 4,773,513 | 9/1988 | Herrmann et al. | 188/276 |
| 4,836,341 | 6/1989 | Hall, III | 188/290 |
| 4,908,905 | 3/1990 | Kanno et al. | 16/82 |
| 5,193,654 | 3/1993 | Vogelsang | 188/296 |
| 5,333,707 | 8/1994 | Kaneda | 188/296 |

FOREIGN PATENT DOCUMENTS

| | | | |
|---|---|---|---|
| 0 707 140 | 4/1996 | European Pat. Off. | |
| 2 383 053 | 10/1978 | France | 123/320 |
| 1 946 167 | 5/1970 | Germany | |
| 2 150 115 | 4/1973 | Germany | 123/320 |
| 33 01 560 | 4/1984 | Germany | |
| 37 13 580 | 11/1988 | Germany | |
| 44 08 349 | 10/1994 | Germany | |
| 1007421 | 10/1965 | United Kingdom | 123/320 |
| 1 464 372 | 2/1977 | United Kingdom | 123/320 |

OTHER PUBLICATIONS

European Search Report of European Application 97 10 4907.7, Applicant: Voith Turbo GmbH & Co. KG.
Abstract of German Publication No. 2 150 115 obtained from Derwent World Patent Index.
Abstract of French Publication No. 2 383 053 obtained from Derwent World Patent Index.

*Primary Examiner*—Raymond A. Nelli
*Attorney, Agent, or Firm*—Marshall, O'Toole, Gerstein, Murray & Borun

[57] ABSTRACT

A drive unit includes a hydrodynamic retarder having a rotor paddle wheel, a stator paddle wheel, and a housing surrounding the rotor and stator wheels. The unit includes a coolant cycle system for an internal combustion engine, the coolant for this coolant cycle also being a working medium of the retarder. The drive unit further includes a working medium container for the coolant. A first pipe connects a hydrodynamic center of the retarder to a valve. A second, leakage pipe is disposed between a working medium outlet of the retarder and the valve. A third pipe is disposed between the valve and the working medium container. The valve is designed such that in a first position, a conducting connection is established between the working medium container and the leakage pipe to provide for a pumping operation of the retarder. When the valve is in a second position, a conducting connection is established between the working medium container and the first pipe for a braking operation of the retarder.

5 Claims, 2 Drawing Sheets

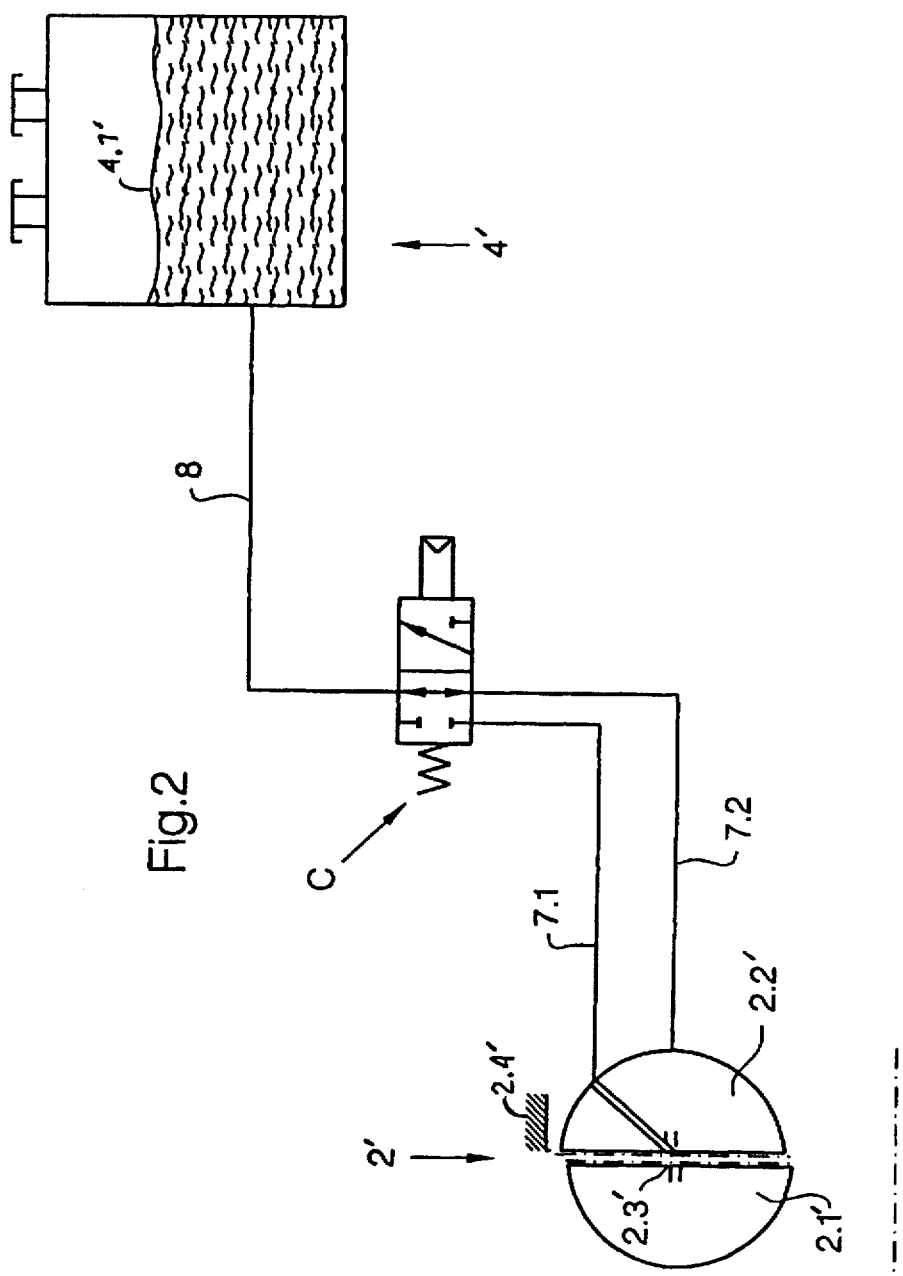

DRIVE UNIT WITH AN ENGINE AND A RETARDER

BACKGROUND OF THE INVENTION

1. Field of the Invention

The invention relates to drive units and in particular to such units having an engine, a retarder and a pump.

2. Description of Related Technology

Drive units having an engine, a retarder and a pump are known in the art. For example, such a drive unit is disclosed in DE 37 13 580 which discloses a retarder for circulating the coolant of a vehicle cooling unit which is disposed in the coolant circulation, both in normal traction operation as well as during retarder operation (i.e., a "water-pump retarder"). The retarder disclosed in DE 37 13 580 is controlled by a suitable valve arrangement in such a way that in case of need, the retarder also can perform braking work. During the "pumping" operation, the power uptake should be as low as possible, while the power uptake should be as high as possible during the retarder "braking" operation. The technical requirements are thus very contradictory. As a result, the "pumping" operation does not operate effectively enough as too much power is taken up (i.e., absorbed).

On the other hand, if the two functions of "pumping" and "braking" are separated structurally, by providing a separate pump in addition to a retarder, then, although the retarder and the pump can be designed in such a way that the functions will be fulfilled optimally, such a system has a high space requirement. This is disadvantageous because the space in vehicles is very limited, especially at the particular location where the pump and the retarder would need to be placed.

For the sake of completeness, the following publications also are disclosed herein:

The retarder disclosed in U.S. Pat. No. 3,720,372 is integrated with the driving engine, permanently attached to the crankshaft, and coolant of the cooling unit continuously flows through the retarder. The rotor of the retarder serves as a circulating pump instead of a special coolant pump. The purpose of this arrangement is to heat the coolant by the retarder in order to heat the passenger compartment. A control system disposed on the retarder serves the purpose of passing or distributing the coolant as a function of its temperature in a bypass line through the radiator.

A retarder also is disclosed in DE 33 01 560 (corresponds to U.S. Pat. No. 4,538,553) which is connected through a switchable coupling to the crankshaft of a driving engine and to the driving wheels of a vehicle. However, the task of the retarder is not the uptake and conversion of the high kinetic braking energy of the vehicle into heat. The retarder is operated exclusively as a heater, whereby the heating output is controlled with consideration of the available drive power. The coolant of the engine also is the operating fluid of the retarder.

A retarder disclosed in DE-AS 1 946 167 (corresponds to U.S. Pat. No. 3,650,358) is connected directly to the crankshaft of an internal combustion engine, the coolant of which also serves as an operating fluid for the retarder. An advantage of this mode of operation is that the heat produced evolves directly in the coolant introduced to the radiator and the heat exchanger between two fluids can be omitted.

EP 707 140 discloses a drive unit with an engine and a hydrodynamic retarder. In order to transport the coolant, a pump impeller is provided which is disposed axially to the rotor paddle wheel of the retarder.

In the retarder systems described herein that are known in the art, a certain power loss occurs during the non-braking operation of the retarder. Namely, during the non-braking operation, the retarder working chamber contains a residue of the working medium. This leads to ventilation losses and heating of the retarder.

SUMMARY OF THE INVENTION

It is an object of the invention to overcome one or more of the problems described above. It also is an object of the invention to provide a drive unit of the type described above in which ventilation losses are largely avoided having a retarder which operates optimally in the braking operation, with a simple structure, and provides for reduced manufacturing costs.

A drive unit according to the invention includes a hydrodynamic retarder having a rotor paddle wheel, a stator paddle wheel, and a housing surrounding the rotor and stator wheels. The unit includes a coolant cycle system for an internal combustion engine, the coolant for this coolant cycle also being a working medium of the retarder. The drive unit further includes a working medium container for the coolant. A first pipe connects a hydrodynamic center of the retarder to a valve. A second, leakage pipe is disposed between a working medium outlet of the retarder and the valve. A third pipe is disposed between the valve and the working medium container. The valve is designed such that in a first position, a conducting connection is established between the working medium container and the leakage pipe to provide for a pumping operation of the retarder. When the valve is in a second position, a conducting connection is established between the working medium container and the first pipe for a braking operation of the retarder.

Other objects and advantages of the invention will be apparent to those skilled in the art from the following detailed description taken in conjunction with the drawing and the appended claims.

BRIEF DESCRIPTION OF THE DRAWINGS

FIG. 2 is a schematic view of a second embodiment of a drive unit according to the invention having a retarder.

DETAILED DESCRIPTION OF THE INVENTION

Figure 1:
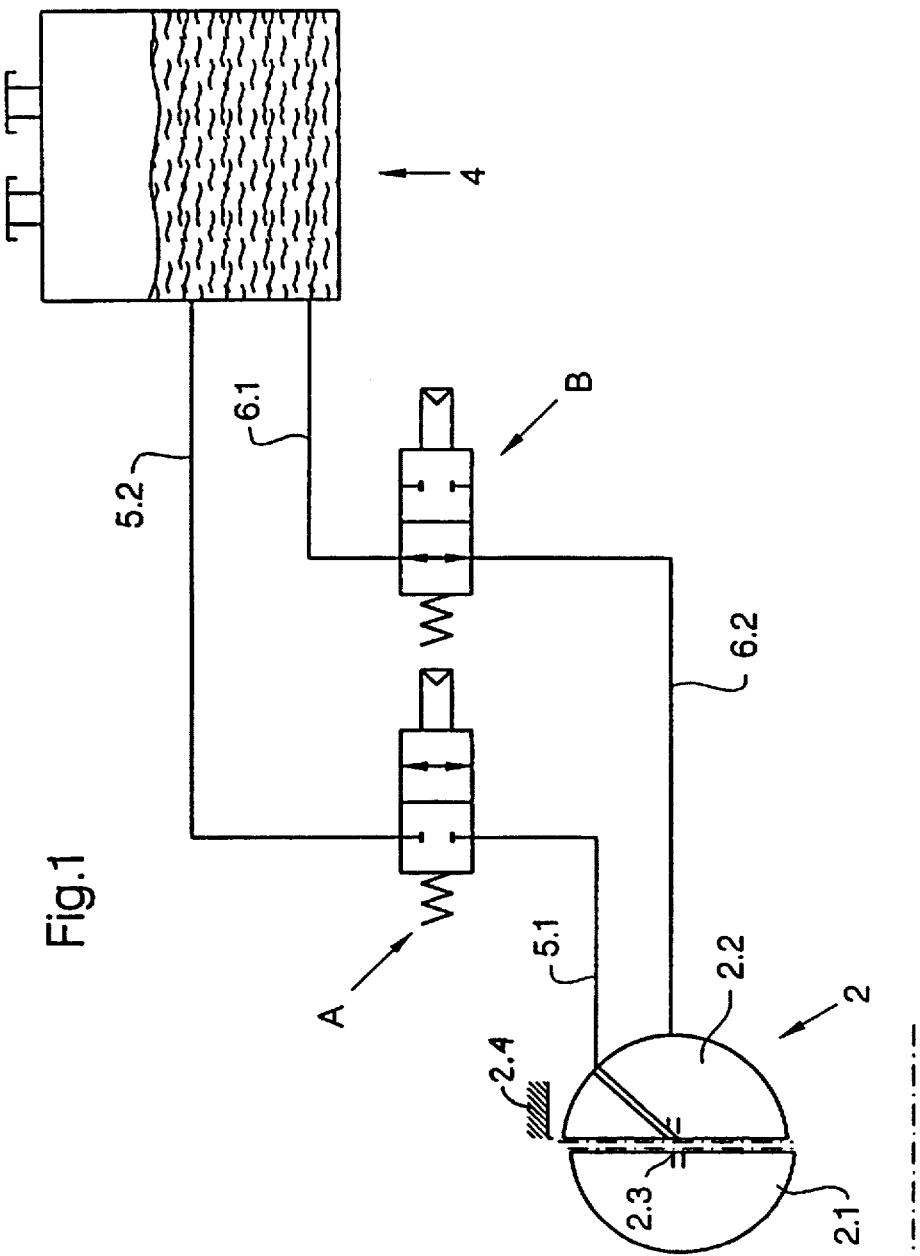
FIG. 1 is a schematic view of a drive unit according to the invention having a retarder.

A drive unit according to the invention, includes at least three pipes and at least one valve for connecting a retarder to a container which holds the coolant for the internal combustion engine, the coolant also being the working medium of the retarder. A first pipe connects a hydrodynamic center of the retarder to a valve. A second, leakage pipe is disposed between a working medium outlet of the retarder and the valve. A third pipe is disposed between the valve and the working medium container.

During the braking operation, when the retarder must be filled, the valve is brought into a position to open the first pipe so that a conducting connection is created between the working medium container and the hydrodynamic center of the retarder. At the same time, when the valve is in the position for opening the first pipe, the second pipe, called the leakage pipe, is closed. When the valve is brought into position to open the first pipe, the retarder is filled immediately, very rapidly, with the necessary amount of working medium, so that the braking action also may occur rapidly.

In the non-braking operation, the valve is placed in a position to close the first pipe. In other words, the conducting connection between the working medium and the retarder is interrupted. The second pipe, the leakage pipe, is, however, opened for free flow. Since the first pipe opens into the hydrodynamic center of the retarder where a reduced pressure exists, the first pipe is evacuated. Almost the entire amount of the working medium is removed from the hydrodynamic center or from the entire retarder working chamber. Therefore, the power loss during the pumping (i.e. non-braking) operation is reduced to a minimum.

In an embodiment of a drive unit/braking system according to the invention shown in FIG. 1, the braking system includes the following elements: a retarder 2, a working medium container 4, a valve A and a valve B, both of which are shown in FIG. 1 as 2/2-way valves. The valves A and B may be operated hydraulically. The retarder 2 has a rotor paddle wheel 2.1 and a stator paddle wheel 2.2 which form a working chamber having a hydrodynamic center 2.3. The wheels are surrounded and supported by a housing 2.4, shown schematically.

The hydrodynamic center 2.3 of the retarder 2 and the valve A are connected by a pipe 5.1. The valve A and the working medium container 4 are connected together by a pipe 5.2.

A pipe 6.1 is disposed between and connects the working medium container 4 and the valve B. A pipe 6.2 is disposed between and connects the valve B and a working medium outlet of the retarder 2.

The two switching valves A and B are decisive for the invention. In the non-braking operation, called the pumping operation, if at all possible, all of the working medium should be removed from the circulation of the retarder 2. This is the type of operation shown in FIG. 1. The switching valve A is in such a position that no conducting connection exists between the working medium container 4 and the hydrodynamic center 2.3 of the retarder 2. Therefore, no working medium can flow to the hydrodynamic center 2.3 of the retarder 2 through the pipe 5.1. However, a reduced pressure develops in the hydrodynamic center 2.3 of the retarder 2, so that the working medium is removed from the working chamber of the retarder 2, except for a last residual amount.

In the non-braking operation, there is a residue of working medium in the working chamber of the retarder 2. This heats up and therefore it must be cooled. For this purpose, a defined amount of working medium as heat carrier is passed through the valve B to the working medium container 4 via the pipe 6.2. The flow resistances of the pipe systems should be especially low in order to provide low-loss removal of the working medium.

On the other hand, during braking operation, the valve A is switched with a valve drive in such a way that a conducting connection is established between the working medium container 4 and the retarder 2 through the pipes 5.2 and 5.1.

An embodiment of a drive unit/braking system according to the invention shown in FIG. 2 also includes a retarder 2' having a rotor wheel 2.1' and a stator wheel 2.2' which form a working chamber having a hydrodynamic center 2.3'. The wheels 2.1' and 2.2' are surrounded and supported by a housing 2.4', shown schematically. The embodiment shown in FIG. 2 also includes a switching valve C as well as a working medium container 4'. The valve C shown in FIG. 2 is a 3/2-way valve. The valve C can be operated hydraulically.

A first pipe 7.1 connects the hydrodynamic center 2.3' of the retarder 2' with the valve C. A second pipe 7.2 connects the valve C with the retarder 2'. A third pipe 8 connects the valve C with the working medium container 4'.

The pipes 7.1 and 7.2 are connected together within the valve C. From the valve C, the pipe 8 leads to the working medium container 4'. The pipe 8 has an opening disposed under a liquid level 4.1' of the coolant in the working medium container 4'.

In the non-braking operation, called the pumping operation, if at all possible, all of the working medium should be removed from the circulation of the retarder 2'. This is the type of operation shown in FIG. 2. The switching valve C is in such a position that no conducting connection exists between the working medium container 4' and the hydrodynamic center 2.3' of the retarder 2'. Therefore, no working medium can flow to the hydrodynamic center 2.3' of the retarder 2' through the pipe 7.1. However, a reduced pressure develops in the hydrodynamic center 2.3' of the retarder 2', so that the working medium is removed from the working chamber of the retarder 2', except for a last residual amount.

In the non-braking operation, there is a residue of working medium in the working chamber of the retarder 2'. This heats up and therefore it must be cooled. For this purpose, a defined amount of working medium as heat carrier is passed through the valve C to the working medium container 4' via the pipe 7.2. The flow resistances of the pipe systems should be especially low in order to provide low-loss removal of the working medium.

On the other hand, during braking operation, the valve C is switched with a valve drive in such a way that a conducting connection is established between the working medium container 4' and the retarder 2' through the pipes 8 and 7.1. The braking momentum should be controllable, reproducible, and optimal. It is important for the braking operation that potential equalization be produced between the working chamber of the retarder 2' and the working medium container 4'. This is done by the position of the valve C chosen at that time.

Another advantageous effect of the valve C consists in the avoidance of secondary circulation during the braking operation. In the embodiment shown in FIG. 2, a pneumatic control line is used for switching the valve C. Naturally, other switching elements are also conceivable, for example, hydraulically or electrically controlled aggregates.

The foregoing detailed description is given for clearness of understanding only, and no unnecessary limitations should be understood therefrom, as modifications within the scope of the invention will be apparent to those skilled in the art.

We claim:
1. A drive unit comprising:
   a) a hydrodynamic retarder having a hydrodynamic center, a working medium outlet, a rotor paddle wheel, a stator paddle wheel, and a housing surrounding said wheels;

b) a coolant cycle system, through which a coolant flows for an internal combustion engine, the coolant also being a working medium of the retarder;

c) a working medium container for the coolant;

d) a first pipe connected to and disposed between the hydrodynamic center of the retarder and a valve;

e) a second, leakage pipe disposed between the working medium outlet of the retarder and the valve; and f) a third pipe disposed between the valve and the working medium container;

g) the valve having first and second positions wherein, in the first position, a conducting connection is established between the working medium container and the leakage pipe to provide for a pumping operation of the retarder, and in the second position, a conducting connection is established between the working medium container and the first pipe for a braking operation of the retarder.

2. The drive unit of claim 1 wherein the valve is a 3/2-way valve.

3. The drive unit of claim 1 wherein the valve is operated hydraulically.

4. The drive unit of claim 1 wherein the valve is replaced by two 2/2-way valves.

5. The drive unit of claim 4 wherein the two 2/2-way valves are operated hydraulically.

* * * * *